United States Patent
Leveson et al.

(10) Patent No.: US 7,566,351 B2
(45) Date of Patent: Jul. 28, 2009

(54) PROCESS FOR PRODUCING ELECTRICAL POWER AND POTABLE WATER FROM BIOMASS

(75) Inventors: Philip D. Leveson, Hannawa Falls, NY (US); John Paul Gaus, Watertown, NY (US)

(73) Assignee: Zeropoint Clean Tech, Inc., Potsdam, NY (US)

( * ) Notice: Subject to any disclaimer, the term of this patent is extended or adjusted under 35 U.S.C. 154(b) by 0 days.

(21) Appl. No.: 11/738,264

(22) Filed: Apr. 20, 2007

(65) Prior Publication Data

US 2007/0246345 A1 Oct. 25, 2007

Related U.S. Application Data

(60) Provisional application No. 60/793,817, filed on Apr. 21, 2006.

(51) Int. Cl.
  *C01B 3/24* (2006.01)
  *C10J 3/54* (2006.01)
(52) U.S. Cl. .......................... 48/198.3; 48/204; 48/209; 48/197 A; 48/198.6; 203/10; 203/27
(58) Field of Classification Search ............... 48/197 R, 48/198.3, 198.6, 204, 209, 197 A; 203/10, 203/27, DIG. 17, DIG. 20
See application file for complete search history.

(56) References Cited

U.S. PATENT DOCUMENTS 6,645,442 B2 * 11/2003 Kaneko et al. ............... 422/187
6,808,543 B2 * 10/2004 Paisley ...................... 48/197 R

FOREIGN PATENT DOCUMENTS

ES       2151811      *  1/2001
WO     WO 81/01713    *  6/1981

OTHER PUBLICATIONS

Search Report and Written Opinion; International Patent Application No. PCT/US2007/067223; Jun. 4, 2008.

* cited by examiner

*Primary Examiner*—N. Bhat
(74) *Attorney, Agent, or Firm*—Bryan Cave, LLP; Charles L. Warner

(57) ABSTRACT

The invention comprises, in one form thereof, a technique which allows biomass to be utilized as a fuel for the co-production of electrical power and potable water in a most efficient manner. Almost any biomass is suitable as a feedstock and biomass which is locally available may be used to fuel the process. The biomass is fed into a gasification device to produce a gas stream containing appreciable amounts of carbon monoxide and hydrogen. The gas stream is used to fuel an electrical generation system Waste heat from the electrical generation system is recovered and used in the purification of saline, brakish or river and well water to produce highly pure potable water.

20 Claims, No Drawings

PROCESS FOR PRODUCING ELECTRICAL POWER AND POTABLE WATER FROM BIOMASS

CROSS-REFERENCE TO RELATED APPLICATION

This application claims benefit of U.S. Provisional Patent Application No. 60/793,817, filed Apr. 21, 2006, entitled PROCESS TO PRODUCE ELECTRICAL POWER AND POTABLE WATER FROM BIOMASS, and commonly assigned to the assignee of the present application, the disclosure of which is incorporated by reference in its entirety herein.

FIELD OF THE INVENTION

The present invention relates to processes for producing fuel from biomass for the production of both electrical power and potable water.

BACKGROUND OF THE INVENTION

Many regions exist within the world which are not connected to a large electricity distribution network. Such areas include, but are not limited to, rural areas and small island states. These areas typically use remote electricity generating devices such as a "genset" for electrical production needs. A typical genset is produced by the coupling of an engine drive to an electrical generator. The engines within such devices are often internal combustion designs and are typically fuelled with gasoline, kerosene, No. 2 fuel oil, No. 6 fuel oil or with other fractions derived from crude oil. The economics of generating power in this method are becoming less attractive as worldwide oil prices have become more expensive. As oil reserves are consumed and global power demand increases it is expected that energy prices will continue to rise.

Many remote or island nations also suffer from a shortage of potable water. Unpredictable levels of groundwater coupled with sporadic and volatile rainfall characteristics can result in vast shortages of potable water leading to difficulties in crop production and even to human suffering. Some water purification technologies, such as reverse osmosis, consume appreciable amounts of electrical power and are not suitable for areas deficient in electrical production capabilities.

Biomass can be used as a renewable energy to offset part of the energy load derived from fossil fuels. Biomass is a very broad term and includes all solids derived from plant matter as well as organic municipal waste. Suitable biomasses include, but are not limited to, sawdust, wood, straw, alfalfa seed straw, barley straw, bean straw, corn cobs, corn stalks, cotton gin trash, rice hulls, paper, municipal solid waste, barks and animal wastes. Almost all biomass has the same ratio of carbon to hydrogen to oxygen, which is summarized as $CH_{1.4}O_{0.6}$. Biomass is found throughout the world making it very suitable as a fuel for distributed generation systems

SUMMARY OF THE INVENTION

The invention comprises, in one exemplary embodiment, a method for utilizing biomass as a fuel for the co-production of electrical power and potable water in an efficient manner. Almost any biomass is suitable as a feedstock and biomass which is locally available may be used to fuel the process. The biomass is fed into a gasification device to produce a gas stream containing appreciable amounts of carbon monoxide and hydrogen. The gas stream is used to fuel an electrical generation system Waste heat from the electrical generation system is recovered and used in the purification of saline, brakish or river and well water to produce highly pure potable water.

One exemplary aspect of the current present invention relates to a process for the conversion of biomass into electrical power and potable water.

Another exemplary aspect of the patent present invention to a process consisting of a biomass fuelled gasifier coupled to a genset and evaporative desalination process to produce potable water from saline sea water.

Yet another exemplary aspect of the present invention relates to a process consisting of a biomass fuelled gasifier coupled to a genset and thermal desalination process to produce potable water from brackish water.

Still another exemplary aspect of the present invention relates to a process consisting of a fuel preparation process coupled to a gasifier, genset and thermal pasteurization/sterilization process to produce potable water from river or well water of low salt content.

Other features and advantages of the present invention will become apparent upon reading the following detailed description of embodiments of the invention, when taken in conjunction with the appended claims.

DETAILED DESCRIPTION OF THE PREFERRED EMBODIMENTS

The invention comprises, in one exemplary embodiment, a method for utilizing biomass as a fuel for the co-production of electrical power and potable water in a most efficient manner. Almost any biomass is suitable as a feedstock and biomass which is locally available may be used to fuel the process. Although not necessary it may be advantageous to prepare the biomass for the process. This preparation may include drying the biomass, size reduction of the biomass through cutting, chopping, grinding or other method and even densification of the biomass into pellets or briquettes utilizing techniques well known to those skilled in the art. The biomass may be stored in a silo with a method of feeding the biomass to the next stage of this process of this may be achieved through manual transportation.

The biomass is fed into a gasification device in which the carbon containing matter is broken down to produce a gas consisting primarily of a mixture of carbon monoxide, carbon dioxide, hydrogen, methane, water and associated nitrogen. Small amounts of higher hydrocarbons and tars may also be present. The gas produced from gasification is often referred to as "syngas" and may have an energy density in the range of from 3 to 12.5 $MJ/m^3$ (Mega Joules per cubic meter). A number of suitable gasification methods are suitable for this operation, including, but are not limited to, updraft gasifiers, downdraft gasifiers, fluidized bed gasifiers, entrained flow gasifiers, pyrolysis reactors and two-stage processes in which the pyrolysis of the biomass and gasification of remaining char may occur through sequential operations. The process may make use of an oxidant, with suitable oxidants being air, oxygen, steam, mixtures thereof or the like. Biomass may be fed to the gasifier either in a continuous manner or utilizing a batch or semi-batch approach. Sophisticated control strategies might be applied to ensure optimum operation of the gasifier as known to those skilled in the art.

The syngas may be pretreated prior to entering the genset engine. The gas may be filtered and quenched to ensure removal of any solids, tar, water and to increase the calorific value of the gas per unit volume. Trace quantities of hydrogen sulphide, hydrogen cyanide, hydrogen chloride and ammonia may also be removed from the syngas using scrubbing or absorption techniques. A liquid liquor or solid absorbent may be used in this operation. After conditioning, the syngas is used as a fuel for the internal combustion engine contained in the generator or genset. A number of different generators are suitable to utilize syngas. Some, such as the Jenbacher range, use a compressor, turbo or supercharger to increase the energy density per unit volume of the syngas. The two output streams from the generator include the electrical power and the waste heat contained in the cooling system and the sensible heat contained in the exhaust gases. Some generators already have a waste capture system in place to provide combined heat and power solutions, again the Jenbacher range is an example of such a unit.

Internal combustion engine driven gensets typically have electrical production efficiencies in the range of from 15 to 50%. The remaining energy exits the generator in the form of heat, often referred to as waste heat. This heat is in the form of sensible heat contained within the coolant used to moderate engine temperature and also as sensible heat in the hot exhaust gases. In the current process this heat is recovered through the use of heat exchangers and used to provide the energy requirement of a thermal based process to produced potable water from saline sea water, brackish water or well or river water. For feeds containing an appreciable content of dissolved salts a desalination process is used. In this process the solution to be purified is heated such that at least some of the water contained in the solution is vaporized. This vapor is then condensed at a second location away from the evaporation site. The efficiency of the desalination process can be further enhanced by recovering the heat of vaporization in a manner which allows the energy to be transferred to the solution entering the process or solution remaining in the process. This can be accomplished through the use of multi-stage flashes or through the use of a single-stage flash with a compressor driven recycle. For a contaminated well or river it may not be required to fully vaporize and condense the water, for some cases it may be sufficient to thermally pasteurize/sterilize the water to ensure complete destruction of any living organisms within the stream.

EXAMPLE

The invention will be further described in connection with the following example, which is set forth for purposes of illustration only. Parts and percentages appearing in such example are by weight unless otherwise stipulated.

Example 1

473 kg/hr of dry biomass with a calorific value of 20.0 MJ/kg is fed into a gasifier, with a gasification efficiency of 95%, to produce syngas. The syngas is used to fuel a 1 MW generator which operates with an electrical generation efficiency of 40%. Approximately 1.6 MW of waste heat is produced by the generator. Approximately 70% of this waste heat or 1.02 MW is recovered from the cooling system and exhaust gas. The waste heat is used to provide the energy input required by a multi-stage thermal desalination process. The desalination process is comprised of three flash units in series with economization through the recovery of the heat of vaporization of the steam. 50,000 gallons of saline solution enter the desalination process. The desalination process is arranged such that 50% of the water is evaporated from the solution. The process operates with an overall thermal efficiency of 42% and for this example 25,000 gallon of potable water can be produced each day. This water is very pure and it may well be possible to mix this water with less clean water to produce water which is still sufficiently pure for human consumption or irrigation purposes. To summarize, the process described in the present example converts 12 tons of dry biomass into a continuous 1 MW supply of electrical power and 25,000 daily gallons of ultra-pure potable water.

For the example described above water production rates could be increased through the use of a flash comprised of more than three stages, i.e., a seven stage flash would double the production rate to around 50,000 gallons per day. It is also possible to consume some of the power and waste heat to operate a single stage flash with a compressor driven recycle. Such an arrangement can lead to very high thermal efficiencies but do require an electrical input. If all of the power and waste heat were to be fed to such a desalination process around 500,000 gallons per day of potable water could be produced.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. It should further be noted that any patents, applications and publications referred to herein are incorporated by reference in their entirety.

The invention claimed is:

1. A method for converting biomass into electrical power and for the production of potable water from saline, brackish or river or well water, comprising:
    a) gasifying a quantify of biomass into a stream containing at least a portion of hydrogen and carbon monoxide;
    b) utilizing the gaseous stream as fuel to run an electricity producing generator;
    c) recovering heat from the generator; and,
    d) introducing the recovered waste heat in an evaporative or pasteurization/sterilization process to produce potable water from saline sea water, brackish water or river/well water.

2. The method of claim 1, wherein the biomass is preprocessed prior to gasification.

3. The method of claim 1, wherein the biomass is converted to a gaseous stream in a downdraft gasifier.

4. The method of claim 1, wherein the biomass is converted to a gaseous stream in an updraft gasifier.

5. The method of claim 1, wherein the biomass is converted to a gaseous stream in a fluidized bed gasifier.

6. The method of claim 1, wherein the biomass is converted to a gaseous stream in a pyrolysis reactor.

7. The method of claim 1, wherein the biomass is converted to a gaseous stream in an entrained flow gasifier.

8. The method of claim 1, wherein the biomass is converted to a gaseous stream in a two stage reactor wherein pyrolysis and gasification occur in separate zones.

9. The method of claim 1, wherein particulates, contaminates and condensables are removed from the gas stream prior to combustion in the engine.

10. The method of claim 1, wherein the generator operates with an electrical generation efficiency in a range of from about 10% to about 60%.

11. The method of claim 1, wherein the waste heat from the generator is recovered and used in an evaporative process to produce potable water.

12. The method of claim 1, wherein the heat introduction step d) comprises e) heating saline or brackish water with the waste energy, either directly or indirectly, produced by the generator;

f) utilizing a distillation column or flash arrangement such that at least part of the saline of brackish stream is converted into a vapor phase; and, g) condensing the vapor while keeping it separated from the solution from which it was produced.

13. The method of claim 12, wherein between about 2% and 95% of the saline or brackish water is transferred into the vapor phase.

14. The method of claim 12, wherein the process is completed in a continuous manner.

15. The method of claim 12, wherein the method is completed in a batch manner.

16. The method of claim 12, wherein the vapor condensing step g) is performed in a heat exchanger where saline or brackish water entering the desalination process is used as the coolant.

17. The method of claim 1, wherein the waste heat from the generator is recovered and used in a pasteurization/sterilization process to produce potable water from river or well water with a low salt content.

18. The method of claim 1, wherein between about 0.5 tons and about 150 tons of biomass are gasified per gasifier per day.

19. The method of claim 1, wherein between about 10 kW and about 15 MW of electrical power is generated by the electrical generator.

20. The method of claim 1, wherein between about 50 and about 500,000 gallon of potable water are produced per gasifier per day.

* * * * *